Sept. 17, 1963 W. GEISLER ET AL 3,103,857
METHOD AND MACHINE FOR MAKING CYLINDRICAL CONTAINERS
Filed Feb. 18, 1960 11 Sheets-Sheet 1

INVENTORS
WILLIAM GEISLER
CARL W. GOODWIN
BY
ATTORNEYS

Sept. 17, 1963 W. GEISLER ET AL 3,103,857
METHOD AND MACHINE FOR MAKING CYLINDRICAL CONTAINERS
Filed Feb. 18, 1960 11 Sheets-Sheet 2

INVENTORS
WILLIAM GEISLER
CARL W. GOODWIN
BY
ATTORNEYS

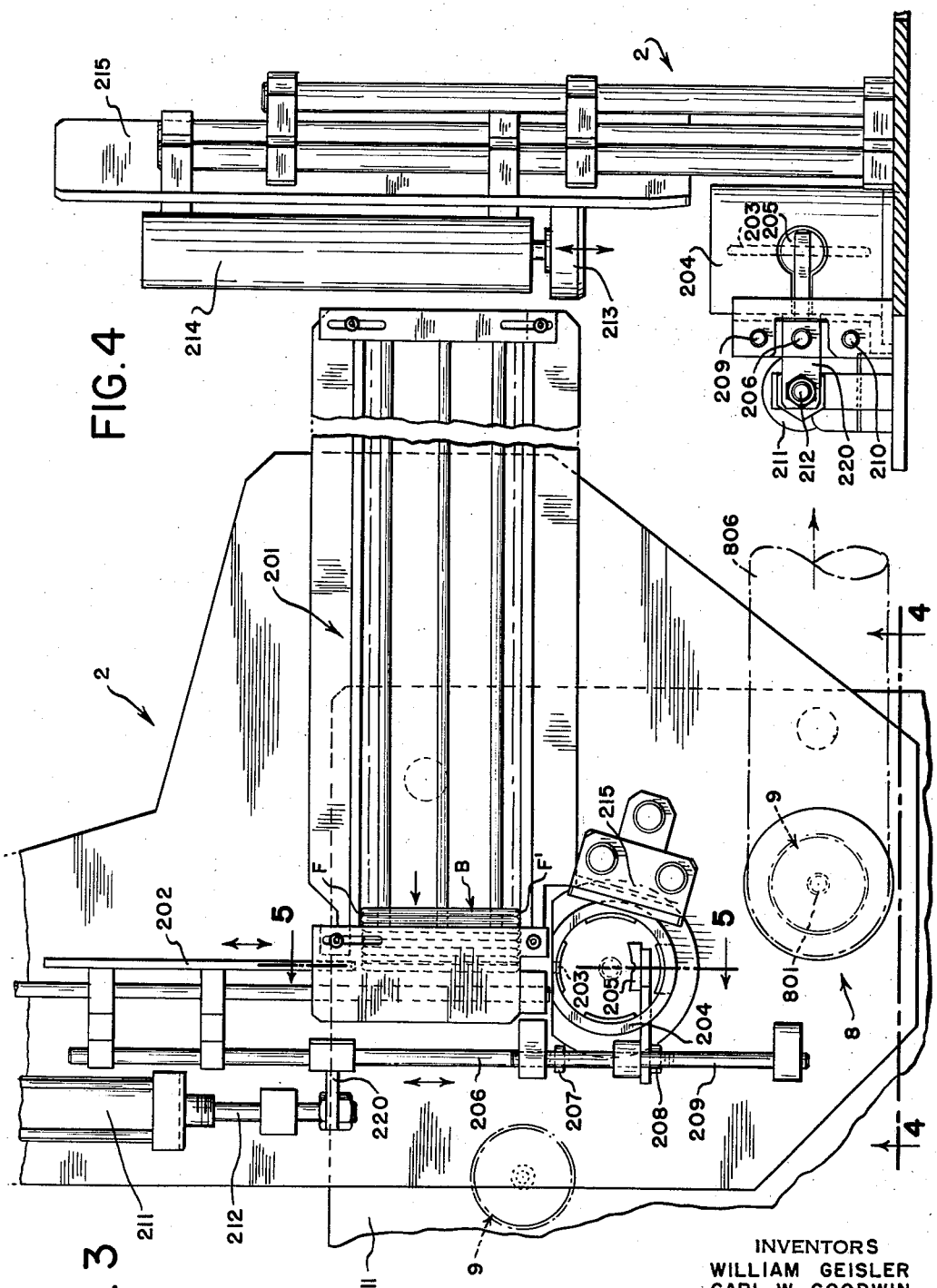

Sept. 17, 1963  W. GEISLER ET AL  3,103,857
METHOD AND MACHINE FOR MAKING CYLINDRICAL CONTAINERS
Filed Feb. 18, 1960  11 Sheets-Sheet 4

INVENTORS
WILLIAM GEISLER
CARL W. GOODWIN
BY Pennie, Edmonds, Morton, Barrows & Taylor
ATTORNEYS

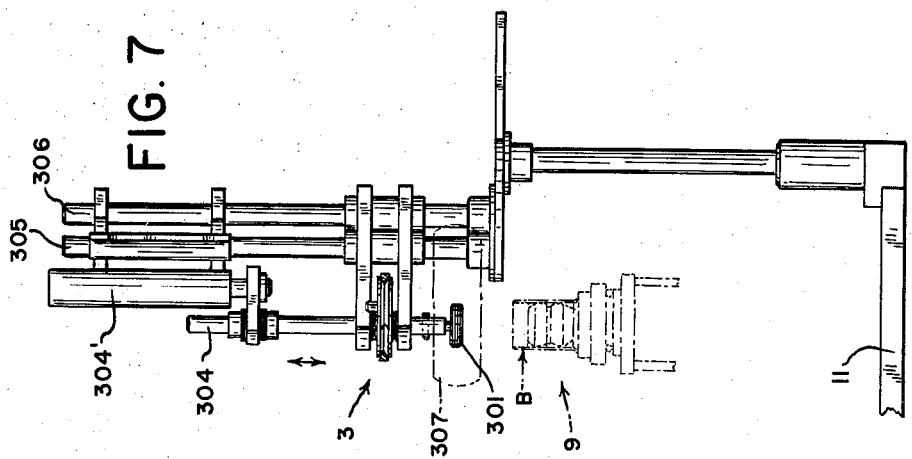
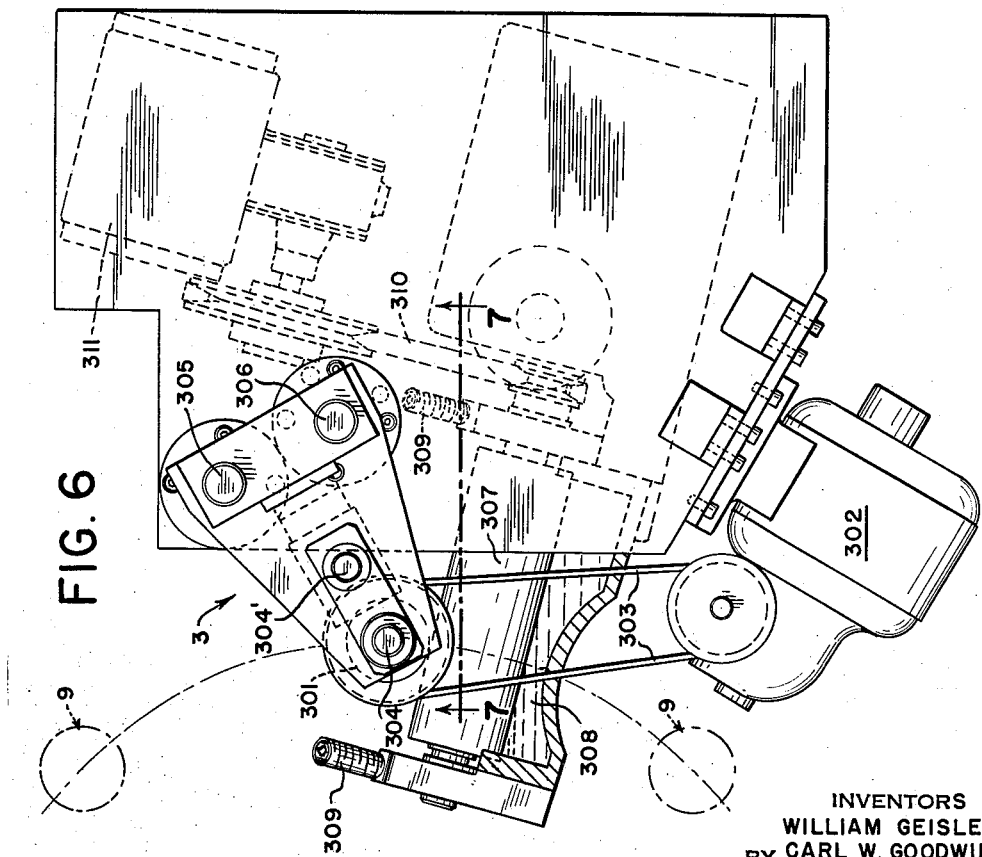

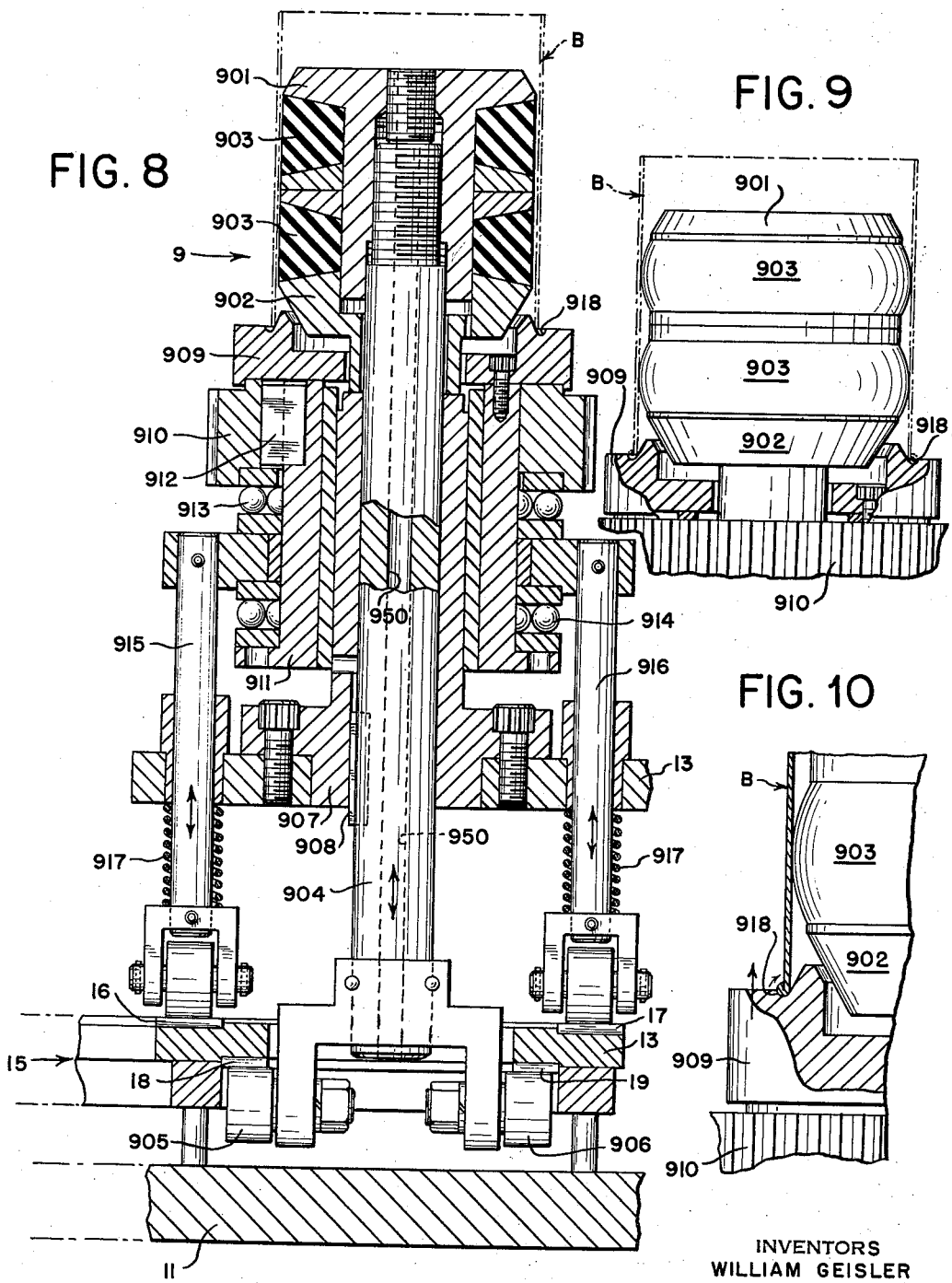

Sept. 17, 1963　　　W. GEISLER ET AL　　　3,103,857
METHOD AND MACHINE FOR MAKING CYLINDRICAL CONTAINERS
Filed Feb. 18, 1960　　　　　　　　　　　　11 Sheets-Sheet 8
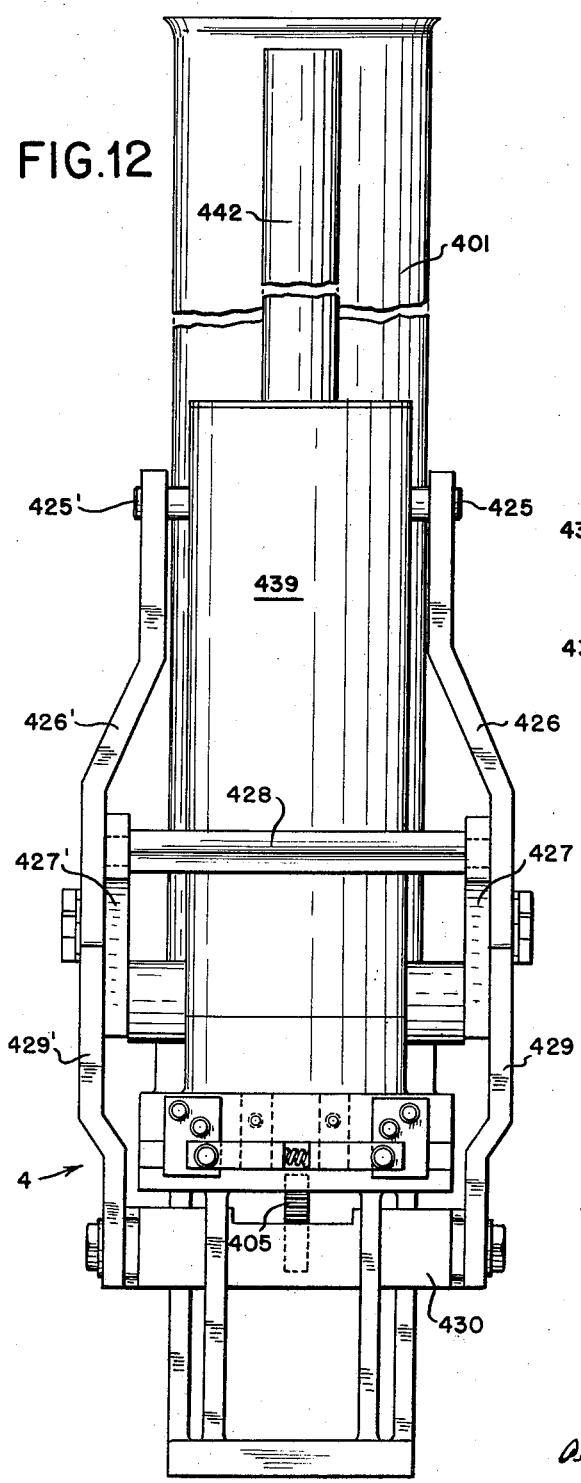
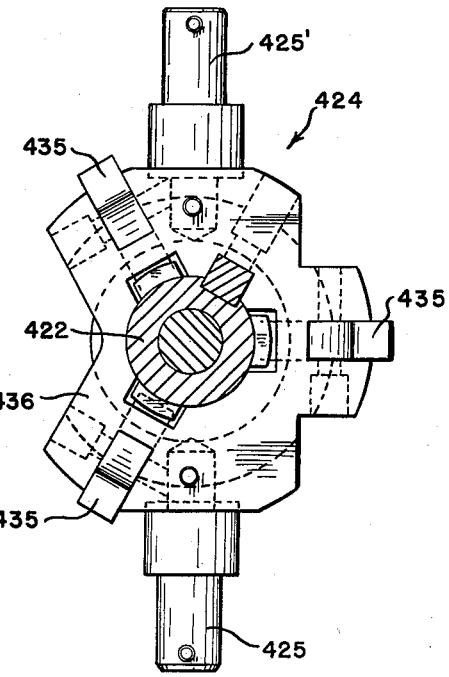
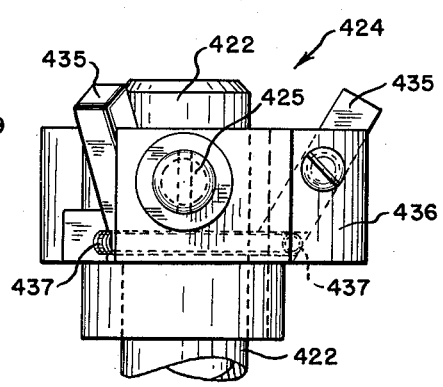
INVENTORS
WILLIAM GEISLER
CARL W. GOODWIN
BY
ATTORNEYS Sept. 17, 1963   W. GEISLER ET AL   3,103,857
METHOD AND MACHINE FOR MAKING CYLINDRICAL CONTAINERS
Filed Feb. 18, 1960   11 Sheets-Sheet 9
FIG. 15
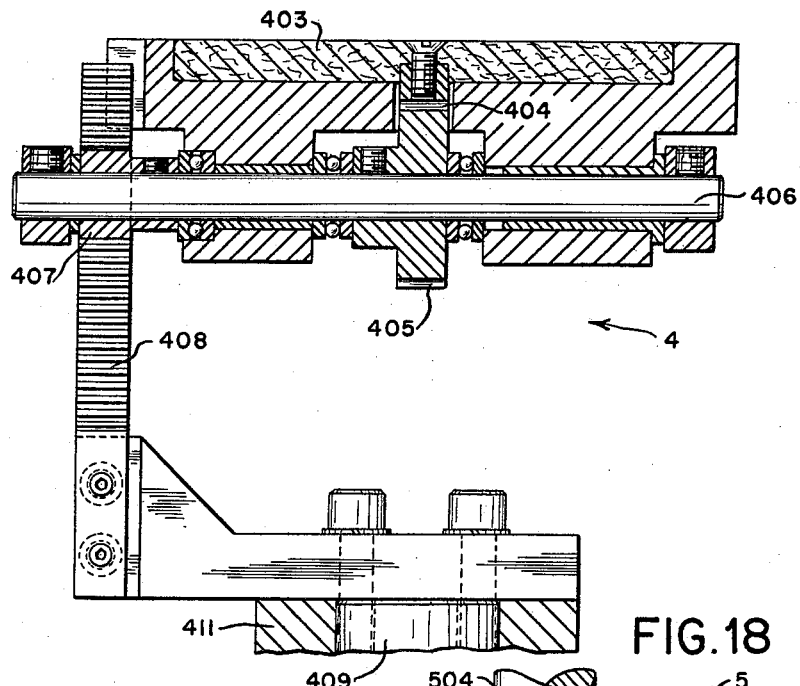
FIG. 16
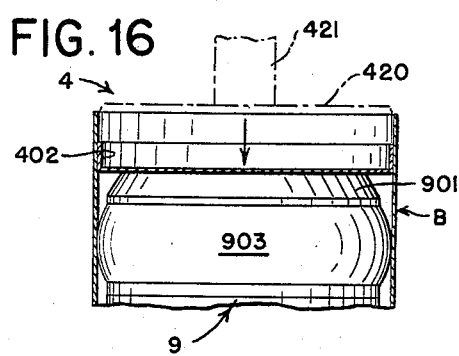
FIG. 18
FIG. 17
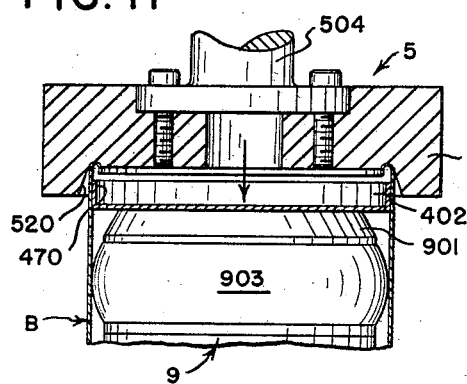
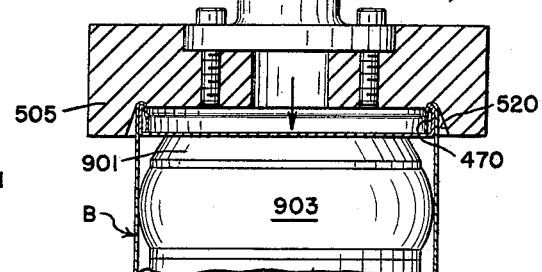
FIG. 19
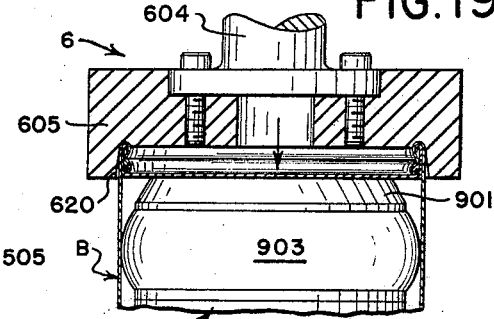
INVENTORS
WILLIAM GEISLER
CARL W. GOODWIN
BY
ATTORNEYS Sept. 17, 1963   W. GEISLER ET AL   3,103,857
METHOD AND MACHINE FOR MAKING CYLINDRICAL CONTAINERS
Filed Feb. 18, 1960   11 Sheets-Sheet 11
FIG. 22
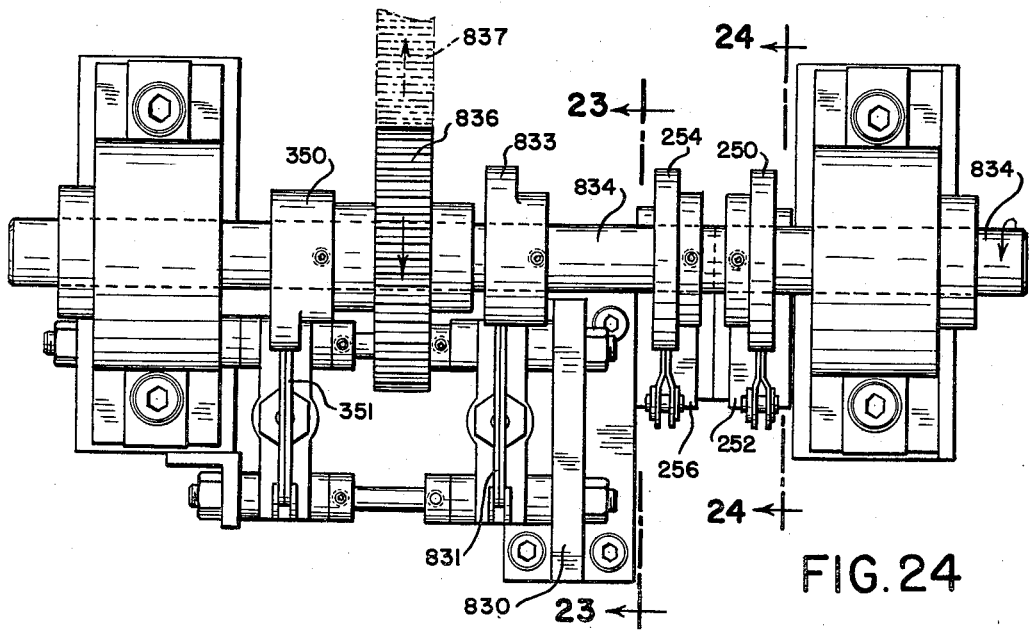
FIG. 23
FIG. 24
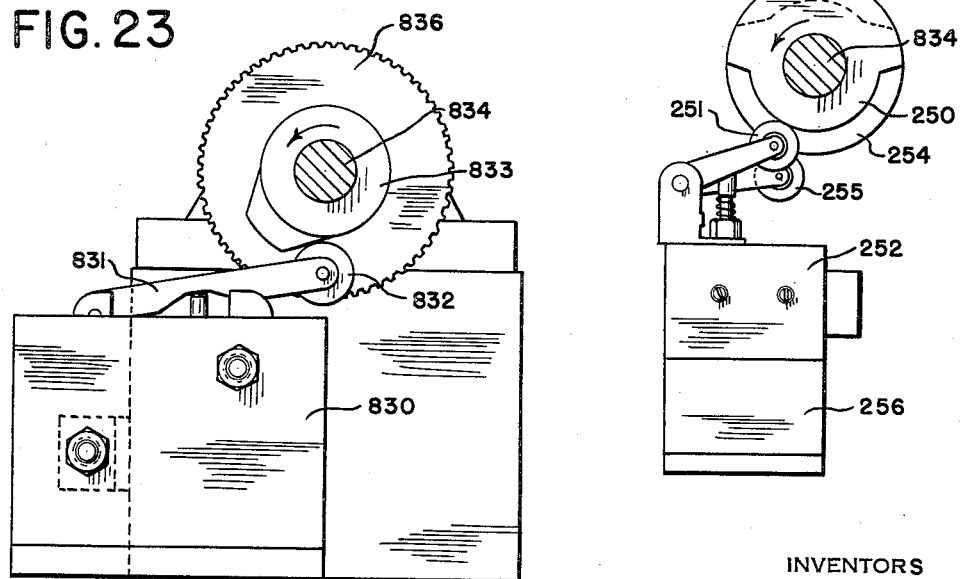
INVENTORS
WILLIAM GEISLER
CARL W. GOODWIN
BY
ATTORNEYS

United States Patent Office 3,103,857
Patented Sept. 17, 1963

3,103,857
METHOD AND MACHINE FOR MAKING
CYLINDRICAL CONTAINERS
William Geisler, Tenafly, and Carl W. Goodwin, North Plainfield, N.J., assignors to American Seal-Kap Corporation, Long Island City, N.Y., a corporation of Delaware
Filed Feb. 18, 1960, Ser. No. 9,588
5 Claims. (Cl. 93—39.2)

This invention relates to a method and machine for making cylindrical containers and more particularly for making cylindrical containers from scored and flattened tubular blanks.

In many industries and in particular the dairy industry where paper containers are used for milk and other products, it is necessary that the containers be completely preformed by large expensive machinery and shipped to the user ready to be filled. This shipping of empty containers necessarily involves the use of valuable shipping space which adds to the ultimate cost of the containers. It is the purpose of our invention to provide for a method of forming a container and a relatively inexpensive machine for effectuating the method by which cylindrical containers may be easily formed from scored and flattened tubular blanks near the place where they are to be filled. By use of such a novel method and machine, a large supply of material for forming containers may be shipped to the user at a fraction of the space and at a considerable reduction in expense than that when complete preformed containers are shipped.

Our method consists generally of utilizing scored and flattened tubular blanks which have thereon two oppositely positioned fold lines. A blank is positioned edgewise into a cylindrically confined space by applying a pushing force on one fold line in order to push the blank through a slot into the confined space while at the same time applying a slightly smaller yielding force on the fold line in order to start the blank spreading inside the confined space. The pushing force is continued until the blank is completely spread to reach a tubular configuration and until it engages the walls of the cylindrically confined space. The tubular blank is then pushed endwise out of the confined space and a bottom lid having an upturned edge is pressed into the bottom end of the tubular blank. The bottom edge of the tubular blank is then crimped with the upturned edge of the bottom lid to thus form a container.

The machine for effectuating the above method comprises generally a plurality of working stations which are circumferentially positioned around a vertical center line of the machine. The machine includes a forming station where a scored and flattened tubular blank is formed into a true tubular configuration, a bottom lid delivery station where a bottom lid having an upturned edge is joined to one end of the tubular blank. a crimping station where a bottom edge of the tubular blank is crimped with the upturned edge of the bottom lid, and an ejection station where the container is removed from the machine and transferred to a conventional filling line. The machine also has spindles which rotate about the vertical center line of the machine through the various stations and on which the tubular blanks are carried. In addition the machine may have a gluing station whereby glue or other sealers may be applied to the bottom edge of the tubular blank before the bottom lid is joined thereto in order to insure a liquid seal. Further the machine may have bead formers for forming a beading portion on the top edge of the tubular blank and also an additional crimping station for further crimping together the bottom edge of the tubular blank with the upturned edge of the bottom lid.

The forming station itself comprises generally a blank magazine, a cylindrical forming station having a slot therein through which a scored and flattened blank may be pushed edgewise by means of a blank delivery slide and an assist plug which is freely slidable on an assist slide and which bears on the opposite end of the blank from that which the delivery slide bears in order to start the blank spreading as it enters the forming section. The forming station in addition may have a transfer plunger by which the tubular blank may be pushed out of the forming section on and over a spindle which is underneath the section.

The spindle on which the tubular blank is pushed by the transfer plunger comprises an upper portion, a lower portion movable with respect to the upper portion and a middle portion comprising a resilient compressible or expandable material. As the upper and lower portions of the spindle are moved together, they will cause the middle portion to expand to securely grip the inner side walls of a tubular blank after it has been pushed thereon by the transfer plunger at the forming station. There is included in the machine a spindle for each station and the spindles in turn are rotated by spindle drive means about a vertical center line of the machine so that they move from one station to another.

After a spindle and tubular blank have been moved from the forming station, they are carried to a gluing station where a rotating glue wheel contacts the inner or outer side walls at the bottom of a tubular blank to place glue thereon. The rotating glue wheel is reciprocally movable in a vertical plane so that it engages the blank at the bottom of its vertical travel and engages a glue carrying member at its upper limit of vertical travel.

The spindle then moves on to a bottom lid delivery station which comprises generally a vertically extending lid magazine, a lid slide for moving a lid from the magazine to a position over the spindle when it is in the lid delivery station and a lid plunger which descends after the lid has been brought over the spindle to push the lid into the bottom of the tubular blank.

The spindle is then rotated to a crimping station which comprises generally a rotating crimping wheel positioned for reciprocal vertical movement and which contacts the bottom edge of the tubular blank when the spindle is in the crimping station. The wheel itself has a dished configuration so that as the rotating wheel is brought into contact with the tubular blank, it will cause the bottom edge of the blank to be crimped with an upturned edge of the bottom lid.

The spindle is then rotated to a further crimping station similar to the first crimping station where a further crimp may be put on the bottom edge of the container to seal the blank with the upturned edge of the lid.

The spindle is then rotated to an ejection station where a blast of air from an ejection nozzle placed below the spindle when it is in the ejection station will force the container off the spindle into an ejection chute which leads to a conventional filling line. Immediately before a spindle reaches the ejection station, the upper and lower portions of the spindle are moved away from each other to cause the middle portion to contract so that the container rests freely upon the spindle.

Each spindle may further be provided with a rotating portion at its lower end which is movable vertically with respect to the spindle body and which may, when brought into contact with the top edge of the tubular blank, bend the top edge over to form a beaded portion.

Reference is now made to the drawings in which a preferred embodiment of our invention is illustrated and where, FIG. 1 is a top-plan view of a machine constructed according to our invention;

FIG. 3 is an enlarged partial plan view of the forming station shown in FIG. 1;

FIG. 4 is an end view of the forming station taken along lines 4—4 of FIG. 3;

FIG. 6 is an enlarged plan view of the gluing station of FIG. 1;

FIG. 7 is a partial side view of the gluing station taken along lines 7—7 of FIG. 6;

FIG. 8 is an enlarged sectional view of a spindle such as illustrated in FIG. 2;

FIG. 9 is a partial sectional view of a spindle showing it in engagement with a tubular blank;

FIG. 10 is a partial sectional view of the spindle of FIG. 8 illustrating the beading of the top edge of a tubular blank;

FIG. 12 is an end view of the lid delivery station as illustrated in FIG. 11;

FIG. 13 is an enlarged sectional view of a portion of the lid delivery station taken along lines 13—13 of FIG. 11;

FIG. 14 is an enlarged side view illustrating a clutch means contained in the lid delivery station;

FIG. 15 is an enlarged sectional view of FIG. 11 taken along lines 15—15;

FIG. 16 is an enlarged partial sectional view illustrating the bottom lid plunger of FIG. 11 forcing a lid into a tubular blank;

FIG. 17 is a partial cross-sectional view illustrating initial contact of a crimping wheel with the tubular blank;

FIG. 18 is a view of the same crimping wheel as FIG. 17 engaging the blank but at a later period in time;

FIG. 19 is a view of a second crimping wheel engaging a tubular blank and a bottom lid;

FIG. 22 is an enlarged view of a portion of FIG. 21 illustrating the pneumatic control means for various pneumatic actuators contained in the machine;

FIG. 23 is an enlarged cross-sectional view of FIG. 22 taken along lines 23—23; and FIG. 24 is an enlarged sectional view of FIG. 22 taken along lines 24—24.

Figure 1:
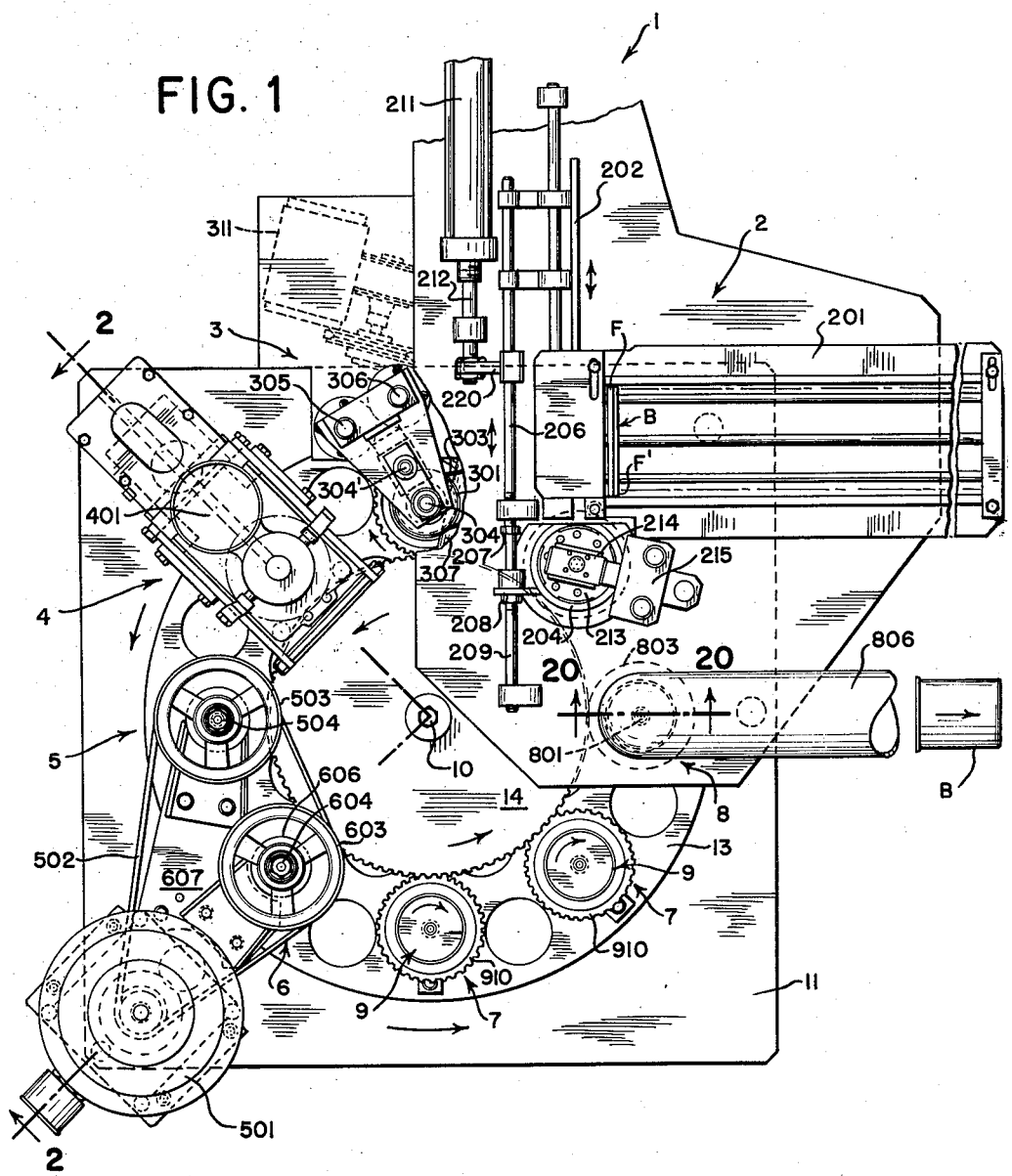
Figure 2:
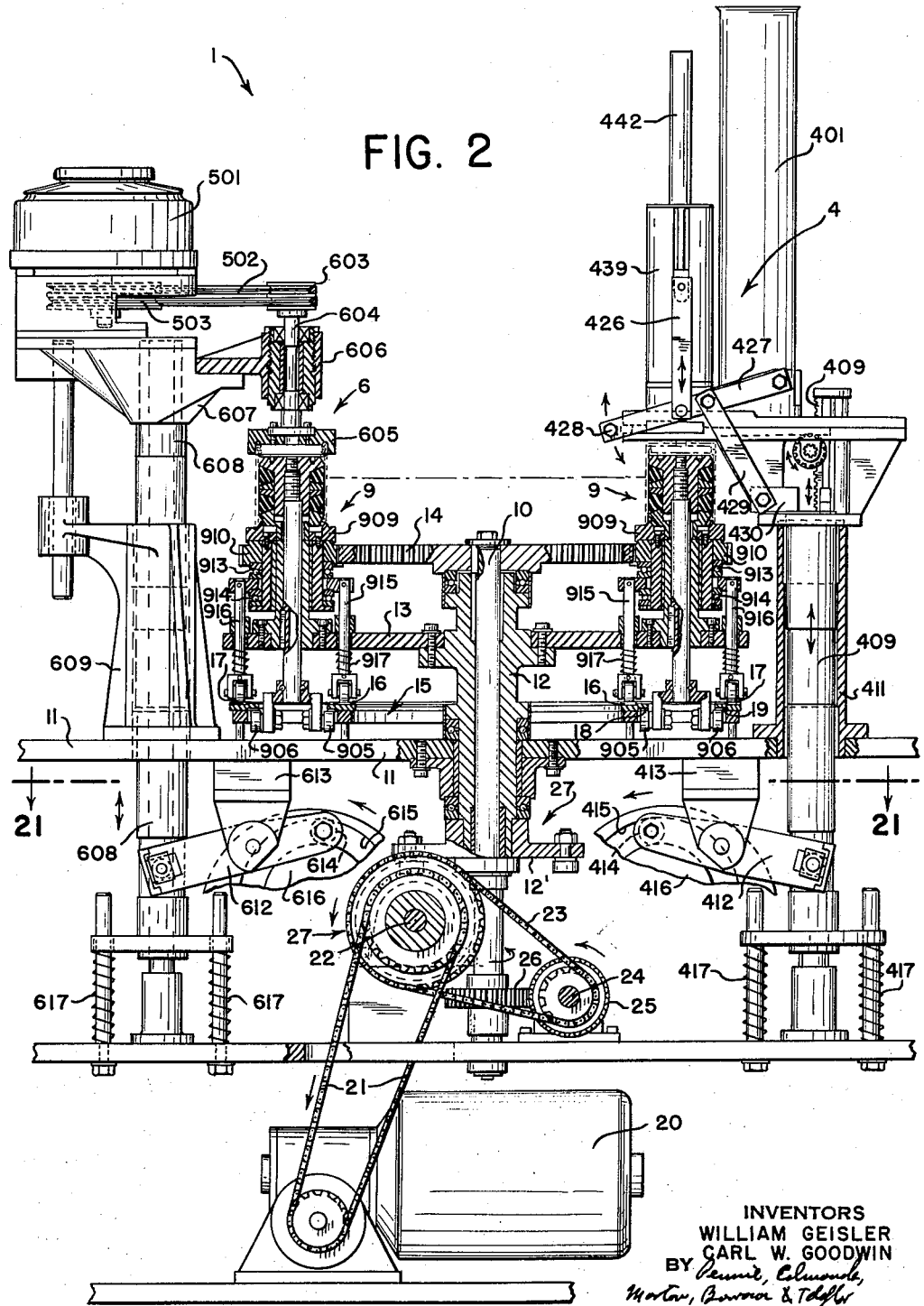
FIG. 2 is a sectional view of the machine of FIG. 1 taken along lines 2—2.

Referring to the drawings in greater detail and in particular to FIG. 1, 1 denotes generally a container forming machine having thereon a forming station 2, a gluing station 3, a lid delivery station 4, a crimping station 5, a second crimping station 6, two similar non-working stations 7 and an ejection station 8. The various working and non-working stations are arranged circumferentially about the center vertical longitudinal axis of the machine which is co-linear with the longitudinal axis of shaft 10, as shown in FIGS. 1 and 2.

The machine itself comprises a base plate 11 on which the various stations are mounted. The shaft 10 is rotatable and extends through base plate 11 and is also journaled in a hollow shaft 12. Shaft 12 has connected therewith a spindle carrying plate 13 which carries a plurality of spindles, denoted generally by 9. A gear 14 is connected to shaft 10 and in turn meshes with gears carried on the spindles to rotate the spindles about their vertical longitudinal axes as will be more fully explained hereafter. A cam plate 15 is mounted on plate 11 and is journaled about shaft 12. The cam plate 15 carries thereon upper cam rings 16 and 17 and lower cam rings 18 and 19, which purpose will be more fully explained hereafter.

A drive motor 20 is drivingly connected by chain 21 to shaft 22 while a chain 23 drivingly connects shaft 22 with shaft 24. Shaft 24 in turn has thereon a worm gear 25 which meshes with spur gear 26 to rotate shaft 10.

Shaft 22 also has mounted thereon an intermittent gear arrangement denoted generally by 27. Gear arrangement 27 comprises a driving cam 28 having therein a track 29 which engages rollers 30 carried by disc 12'. It is seen by reference to FIG. 21 that as driving cam 28 rotates in the clockwise direction, the track 29 will engage a roller 30 to cause the disc 12' and shaft 12 to rotate in the counterclockwise direction. This rotation will be intermittent as the track 29 will engage a roller 30 only during ½ revolution of the shaft 22.

Figure 5:
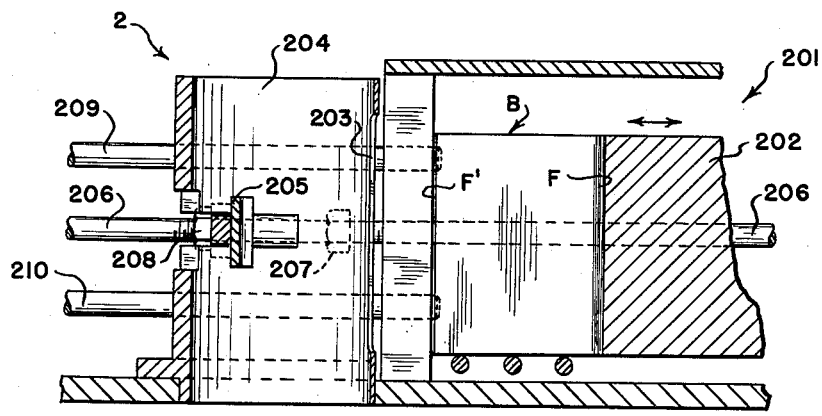
FIG. 5 is an enlarged sectional view of the forming station taken along lines 5—5 of FIG. 3.

Examining the stations in the sequence that the containers are moved therethrough, reference is now made to FIGS. 3, 4 and 5 which illustrate the forming station. The forming station 2 comprises a magazine denoted generally by 201 which has contained therein a number of scored and flattened tubular blanks B having thereon fold or scored lines F and F'. The blanks are fed from the magazine to a position where they may be engaged by the delivery slide 202 by means of a conventional counterweight (not shown). The individual blanks B are engaged along the fold line F by a delivery slide 202 which moves the blank B through a slot 203 contained in a cylindrical forming section 204 which constitutes a confined space to shape the flattened tubular blank into a tubular blank. An assist plug 205 extends into the interior of the cylindrical forming section 204 and in turn is slidably mounted on an assist plug slide 206. The assist plug slide in turn has fixedly mounted thereon collars 207 and 208 which are adapted to engage and move the assist plug 205 on the stationary guide rods 209 and 210. A pneumatic cylinder 211 has therein a piston (not shown) which is connected to piston shaft 212 which in turn is connected to the assist plug slide 206 by link 220. Slide 206 is joined to slide 202 by links (not shown) so that movement of both slides is controlled by the piston.

As the slide 202 pushes a flattened blank B through slot 203 into the cylindrical forming section 204, the fold line F' of the blank will engage the assist plug 205. Assist plug 205 will not move since it is freely mounted on assist plug slide 206 and its friction with guide shafts 209 and 210 is sufficient to hold the assist plug stationary until it is contacted by collar 207. As the blank is continued to be pushed against assist plug 205, and the assist plug being stationary, the blank has no other recourse than to begin to spread. As the collar 207 contacts assist plug 205, it will move the plug until it is flush with the side walls of forming section 204. The slide 202 will continue to push the blank B through the slot until the edge of the slide 202 is also flush with the side walls of section 204 at which time the blank will be tubular and will be confined substantially completely on its outer periphery by the inner walls of the forming section. As the slide is returned to the position, as shown in FIG. 3, and after the blank has been removed from the forming section, collar 208 will engage the assist plug 205 to return it to the position shown in FIG. 3, where the forming section is ready to receive a new flattened tubular blank.

A plunger 213 is movable in the vertical direction, as shown in FIG. 4, and is connected to a piston in a pneumatic cylinder 214 carried by the stand 215. As the plunger 213 is moved downwardly, it will engage an edge of the tubular blank to force it downwardly out of the forming section 204 onto a spindle 9 as shown in FIG. 8. After the blank has been placed onto the spindle, the plunger 213 which comprises a transfer means for transferring the blank from the forming section onto a spindle is moved upwards by pneumatic pressure being admitted to cylinder 214.

The spindle 9, as shown in FIG. 8, comprises an upper portion 901 and a lower portion 902 separated by a middle portion 903. The middle portion 903 comprises a resilient compressible material, such as rubber, which when compressed will expand. The upper portion 901 is connected to a spindle shaft 904 which in turn has mounted on its lower end cam followers 905 and 906 which engage cam rings 18 and 19 respectively. The lower portion 902 of the spindle is mounted on an arm 907 which in turn is mounted on spindle carrying plate 13. The shaft 904 is slidable in arm 907 and is keyed thereto by means of key 908.

When the spindle is in the forming station and positioned directly beneath the forming section 204, the cam followers 905 and 906 are in a valley or depression of cam rings 18 and 19. In this position the upper and lower portions 901 and 902 are forced apart by the resilient middle portion 903 so that a blank B may be moved down over all of the portions by means of plunger 213. As the spindle is moved from the forming station, the cam followers 905 and 906 will contact a rise on the cam rings 18 and 19 which will cause the shaft 904 to move in a downward direction and so compress middle portion 903 to cause it to expand and securely grip the inner side walls of the tubular blank, as shown in FIGS. 9 and 10, in order to hold the blank securely on the spindle during passage through subsequent working stations.

While we have disclosed the middle portion of the spindle as being made of rubber, it is obvious that the middle portion could be made of segmented metal parts urged to the contracted position by coil springs and urged to the expanded position by corns mounted on the spindle shaft and engaging the segmented parts.

The spindle also has thereon a rotatable beading portion 909 which is secured to a gear 910. Gear 910 in turn meshes with gear 14 so that the beading portion 909 is continually rotated by means of gear 14 and shaft 10. Gear 910 is keyed to a member 911 by means of key 912. Member 911 in turn is mounted in anti-friction bearings 913 and 914 which connect with cam followers 915 and 916. Cam followers 915 and 916 in turn run upon cam rings 16 and 17 and are held in firm contact therewith by means of springs 917. When the cam followers 915 and 916 contact a rise on the cam rings 16 and 17, they will raise upward to lift the rotating beading portion 909 into contact with the top edge of the tubular blank B. The beading portion 909 has a dished configuration 918 which will cause the top edge of the tubular blank to be bent backwards to form a bead, as shown in FIG. 10. While the bead of the container appears at the bottom of FIG. 10, it is actuallly on the top portion of the completed container so that it is referred to as being on the top edge of the tubular blank while the portion of the blank receiving the lid, shown on the top portion of FIG. 2, is referred to as the bottom of the tubular blank.

The beading of the top of the tubular blank may take place during any position of the spindle between the forming station and the ejection station since the beading portion 909 of the spindle is at all times rotated by the shaft 10.

After leaving the forming station, the spindle carrier 13 is rotated to bring a spindle to a gluing station 3 as shown in FIG. 1. The gluing station 3 comprises a rotatable glue wheel 301, as shown in FIGS. 6 and 7, which is rotated by means of motor 302 and belt 303. The wheel 301 is movable vertically by means of glue plunger 304 which is connected to a pneumatic cylinder 304' carried by the stands 305 and 306. At its upward limit of vertical travel, the glue wheel 301 engages a glue carrying member 307 which extends into a bath of glue 308. The amount of glue on member 307 may be varied by regulating the depth that the member 307 extends into bath 308 by adjusting screws 309. Glue carrying member 307 is continually rotated by means of drive belt 310 and motor 311.

When a spindle is in the gluing station and positioned directly below the glue wheel 301, as shown in FIG. 7, a pneumatic cylinder 304' is actuated to cause the plunger 304 to move downwardly so that the rotating glue wheel will engage the inner side walls of the bottom end of the tubular blank B to coat the side walls with a layer of glue. If required, the glue wheel 301 could be substituted with a smaller wheel and positioned so as to contact the outer end of the blank in order to impress glue thereon. While glue is mentioned, it is understood that any composition may be used which will when applied to a tubular blank help seal the blank with a bottom lid. In the event that the container is to be used for dry goods, it is not necessary that glue or sealant be applied to the container and the gluing station may be dispensed with.

Reference is now made to FIGS. 11–15 which illustrate structure comprising a bottom lid delivery station which is the next working station in the machine to which a spindle moves after leaving the gluing station. The lid delivery station comprises a magazine 401 in which a plurality of bottom lids 402 are stacked. The lids 402 are moved over a spindle 9 when it is in the bottom lid delivery station by means of a lid delivery slide 403 which is reciprocally movable in the lateral direction by means of rack 404 which meshes with spur gear 405 mounted on shaft 406.

Figure 21:
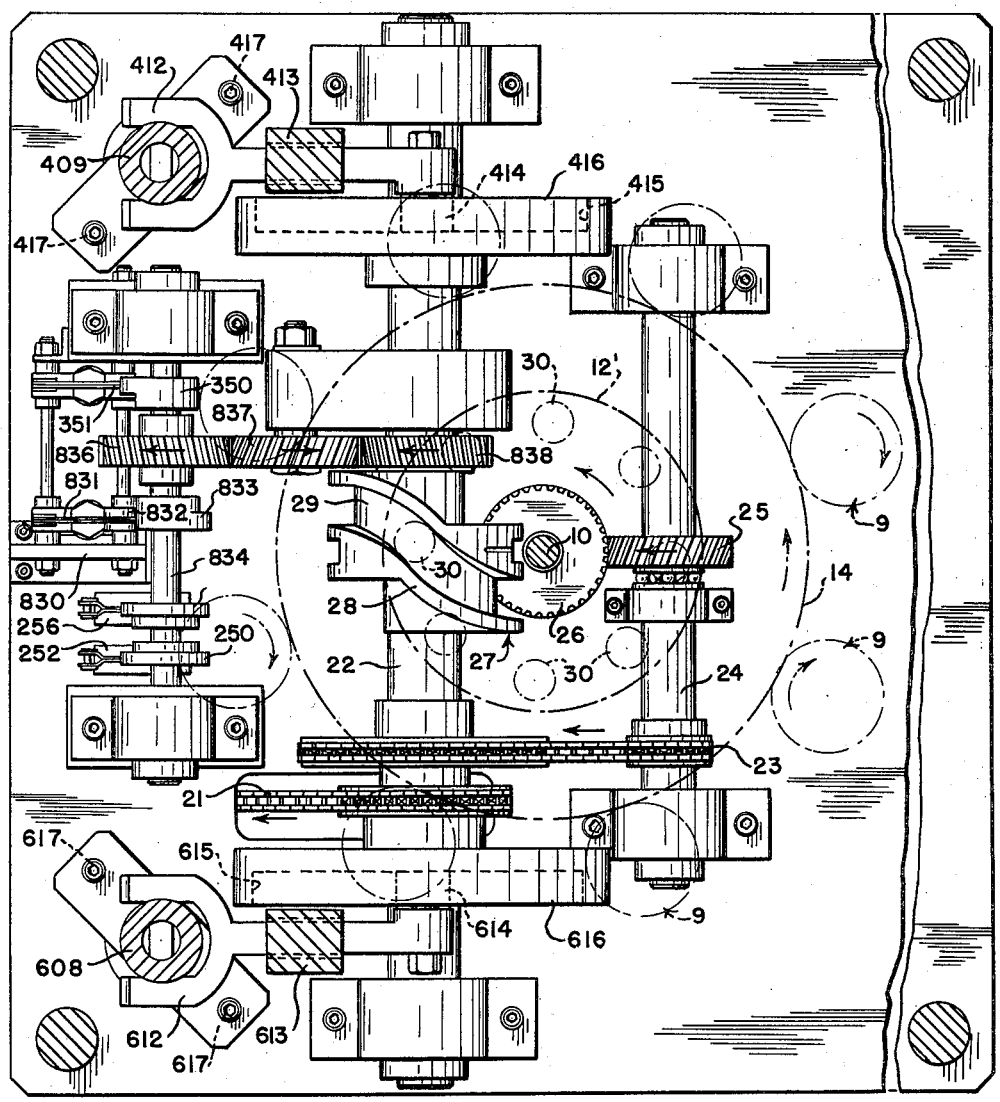
FIG. 21 is an enlarged partial cross-sectional view of the machine taken along lines 21—21 of FIG. 2.

Shaft 406 in turn is rotated by means of a gear 407 mounted thereon which in turn meshes with rack 408 connected to rod 409, as shown in FIG. 2, which is mounted for reciprocal vertical travel in member 411 which in turn is carried by the station carrying member 11. Rod 409 is connected to an arm 412 which is pivotally mounted on arm carrying member 413. The end of arm 412 not connected to rod 409 has thereon a cam follower 414 which rides in a track 415 carried on wheel 416 which, as shown in FIG. 21, is mounted on shaft 22. Since FIG. 2 represents a pie shaped section of FIG. 1, wheel 416 does not appear as mounted on shaft 22 whereas, as shown in FIG. 21, in fact it is. Springs 417 serve to cushion downward movement of the rod 409. It is seen that as the wheel 416 and shaft 22 are rotated, the rod 409 will be moved in an up and down direction and so cause the lid delivery slide 403 to move reciprocally in the lateral direction.

A lid plunger 420 is reciprocally movable in the vertical direction to engage and push a lid 402 down into a blank B after the lid has been positioned over the spindle 9 by means of the lid delivery slide 403. The plunger is carried on a shaft 421 which in turn is slidable in hollow shaft 422. Hollow shaft 422 in turn is slidable in plunger carrying means 423 which is fixed with respect to the lid delivery station.

A one-way clutch denoted generally by 424 is mounted on the upper end of shaft 422. The clutch 424 in turn has mounted thereon axles 425 and 425' on which are journaled arms 426 and 426'. Arms 426 and 426' in turn connect to arms 427 and 427' which are connected at one of their ends to the magazine 401 and which are joined at the other of their ends by cross bar 428. Arms 427 and 427' are connected by means of links 429 and 429' to link carrying member 430 which in turn is connected to rod 409.

The clutch 424 comprises engaging fingers 435 which are rotatably mounted in finger carrying member 436 and which are urged into contact with the hollow shaft 422 by means of springs 437. A stop 438 is positioned in a cover 439 carried by the plunger carrying member 423. A compression spring 440 urges the plunger 421 outwardly of the hollow shaft 422 while a tension spring 441 is connected at one of its ends to cover extension 442 and at its other end to hollow shaft 422 to urge the shaft 422 in the upward direction.

Figure 11:
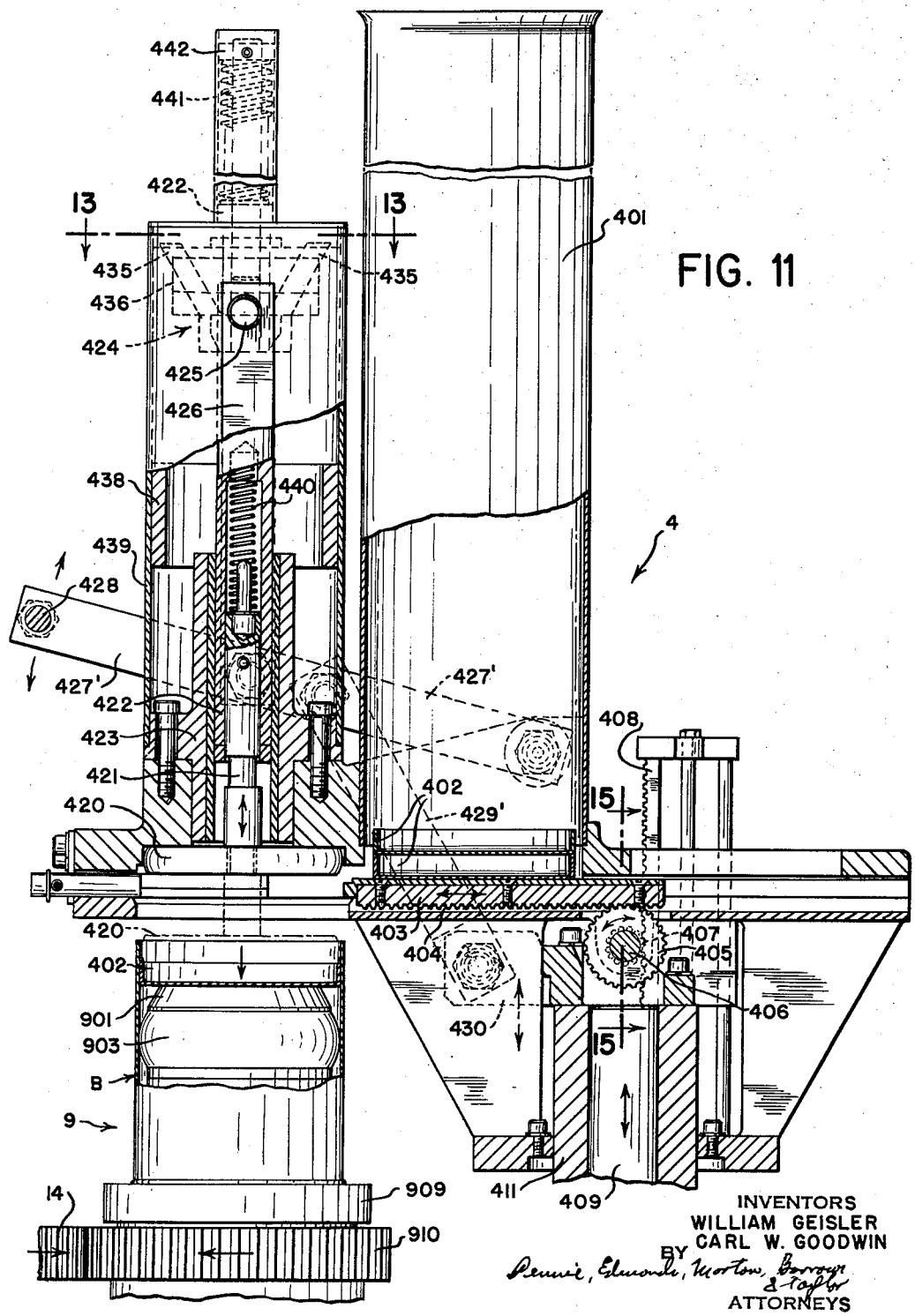
FIG. 11 is an enlarged partial sectional view of the lid delivery station of FIG. 2.

It is seen that as rod 409 moves upward, it will move link 429 upward to rotate arm 427 which in turn will lift arm 426 thus raising clutch 424 while at the same time slide 403 moves a lid over a spindle. As the rod 409 moves downward, arm 427 will be moved downward to bring the hollow shaft 422, the plunger 420 and the clutch 424 all in a downward direction to force the lid 402 into the blank. As the clutch continues to move downward, its fingers 435 will contact the stop and will move inwardly against the force of springs 437 to release the clutch from engagement with the hollow shaft 422. Tension spring 441 will then pull the hollow shaft 422, plunger 421 and plunger 420 up in a vertical direction to lift the plunger out of engagement with the container and position it above the slide 403 as shown in FIG. 11.

The arrangement of links 429, arms 427 and 426 gives an exaggerated vertical movement to plunger 420 for a given vertical movement of the rod 409.

While the bottom lids as shown in the magazine have an upturned edge, it is obvious that flat lid blanks could be used with the edge being formed in a die positioned over the spindle when the lid plunger forces a lid blank down to engage the tubular blank.

The next working stations after the lid delivery station on which work is done to the blank and lid are the precurling and final curling stations 5 and 6 as shown in FIGS. 1, 2 and 17–19. The precurling station 5 and the final curling station 6 both comprise generally electric drive means 501 connected by a drive belt 502 to a drive wheel 503 contained in the precurling station 5 and mounted on shaft 504 and a drive wheel 603 contained on the final curling station 6 mounted on shaft 604. The curling stations 5 and 6 are similar except for the configuration of the curling wheel which will be described more fully hereafter. Referring to FIG. 2 the final curling wheel 605 is mounted on a shaft 604 which is similar to shaft 504, as shown in FIG. 1. Shaft 604 in turn is carried by shaft carrying member 606 which is mounted on motor carrying bracket 607. Motor carrying bracket 607 in turn is mounted on a reciprocal vertically movable rod 608 which passes through curling stations carrying member 609 mounted on the station carrying plate 11. Rod 608 is connected to an arm 612 similar to arm 412 and which is pivotally mounted on arm carrying member 613. A cam follower 614 is mounted on the arm 612 and is adapted to follow a cam track 615 contained in a wheel 616 mounted on shaft 22, as shown in FIG. 21. Springs 617, similar to springs 417, cushion movement of the rod 608 in the downward direction. It is seen that when rod 608 is moved in the vertical direction due to the cam follower 614 following track 615, the carrying bracket 606, motor 501, shafts 504 and 604 will all likewise move in a vertical direction to move the curling wheels 505 and 605 into and out of engagement with the blanks.

Precurling wheel 505, as shown in FIG. 17, has a dished portion 520 which when brought into contact with the edge of the tubular blank B, will cause the bottom edge to be bent over upstanding portion 470 of the bottom lid 402. As the precurling wheel 505 is brought further into contact with the blank B, the edge of the blank will be bent completely over the upstanding portion 470 of the bottom lid as shown in FIG. 18 so that there is a side portion of a double thickness of the blank cooperating with the upstanding portion of the lid to form a seal. While we have shown as a preferable container construction, lids having an upturned edge, such lid construction is not necessary and containers could be made embodying our invention utilizing lids having no upturned edge. Further, curling wheels could be provided whereby the edge of the bottom lid could be turned over the bottom edge of the blank instead of turning the blank edge over the lid edge as shown.

The spindle 9 is then rotated by the spindle drive means to the final curling station 6, as shown in FIG. 2. The curling wheel 605 of the final curling station 6 differs from the curling wheel 505 only in that the dished portion 620 has a steeper side wall which will cause the bent over edge of the blank and the upturned edge of the lid to wrinkle when the curling wheel 605 is forced around the bottom edge of the blank, as shown in FIG. 19. This wrinkling or crimping of the bottom bent over edge of the blank and of the upturned edge of the lid forms a lock which further secures the bottom lid to the bottom of the container.

After the lid has been further sealed to the container by the final curling station, the spindle is then rotated by the spindle drive means direct to an ejection station, or as shown in FIG. 1, through non working stations 7 onto the ejection station 8. The non working stations 7 are to take care of future working steps that may be desired to be done to the container and blank such as coding, printing or the like.

Figure 20:
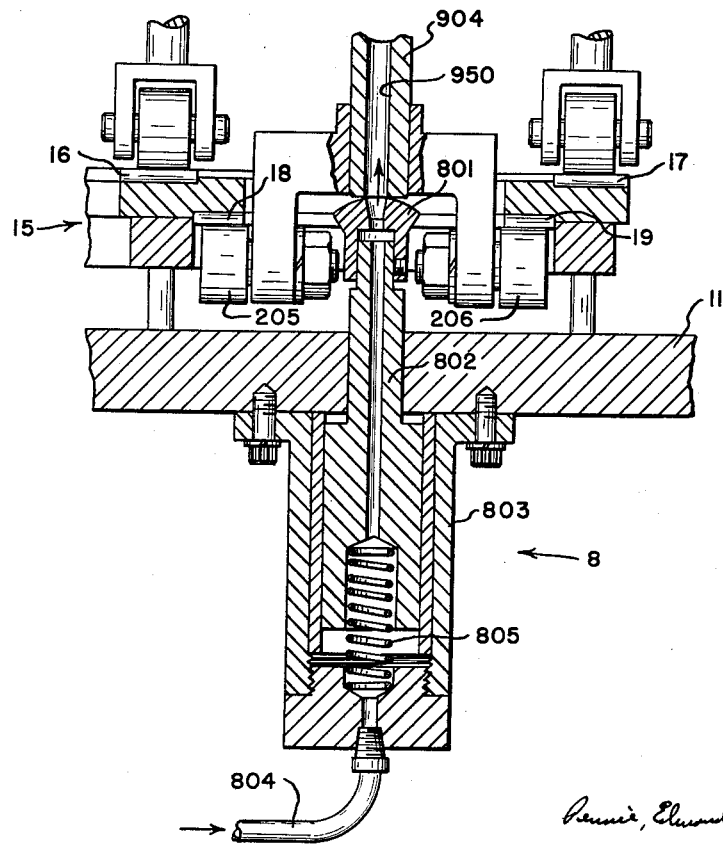
FIG. 20 is an enlarged partial cross-sectional view of the ejection station as taken along lines 20—20 of FIG. 1.

The ejection station 8, as shown in FIG. 20, comprises an ejection blast nozzle 801 which is mounted on the end of a piston 802. Piston 802 in turn is slidable in pneumatic cylinder 803 which is connected by a conduit 804 to a pressure control valve referred to hereafter. A spring 805 serves to urge piston 802 out of cylinder 803. When spindle 9 is positioned directly above the blast nozzle so that the spindle shaft 904 is in the position shown in FIG. 20, a pressure control valve 830 shown in FIG. 22 is actuated to admit pressure into the cylinder 803. This will cause the piston 802 to rise upward until the blast nozzle 801 contacts the bottom of shaft 904. Shaft 904 has a bore 950 so that air pressure is exerted up through the shaft against the bottom lid of the container.

Immediately before the spindle reaches the ejection station, the compressible middle portion 903 of the spindle is contracted by the cam followers 905 and 906 contacting a depression or valley in the cam rings 18 and 19. The middle portion of the spindle therefore no longer grips the inner side walls of the blank so that the container is free to be pushed off of the spindle by the force of the air passing through the bore 950 of the spindle shaft. The container may be ejected from the spindle through an ejection chute 806 onto a conventional filling line (not shown).

The pneumatic blast of air through the ejection nozzle is controlled by means of a pneumatic pressure control valve 830, as shown in FIGS. 21, 22 and 23. Valve 830 has thereon an actuating arm 831 which has at its end a cam follower 832 which follows cam 833 mounted on cam drive shaft 834. Cam drive shaft 834 in turn has mounted thereon a spur gear 836 which meshes with idler gear 837 which in turn is driven by gear 838 mounted on shaft 22. Valve 830 is connected to a source of pressure (not shown) and is also connected to the pneumatic cylinder 803 by conduit 804. Also mounted on shaft 834 is a cam 250 as shown in FIGS. 22 and 24, on which rides the cam follower 251 which in turn operates a pneumatic pressure valve 252. Pneumatic pressure valve 252 controls admission of pneumatic pressure to a pneumatic cylinder 214 to operate the transfer plunger 213 as shown in FIG. 4.

A cam 254 is likewise mounted on shaft 834 and bears against the cam follower 255 to operate still another pressure control valve 256 which is similar to valve 252. Valve 256 in turn controls admission of pneumatic pressure to pneumatic cylinder 211 to operate blank delivery slide 202 and the assist plug plunger 206. A cam 350 mounted on shaft 834 operates pressure control valve 351 to control admission of pneumatic pressure to cylinder 304' to raise and lower the glue wheel plunger 304.

In order that the machine may produce a maximum number of containers in a minimum of time, spindles are provided for each station so that blanks are continually in the process of being made into containers at all stations.

By utilizing a machine for forming tubular containers as illustrated in the drawings, a user can easily incorporate the container forming steps into existing filling lines with a minimum of change. All that is required is that the end of the ejection chute 806 be placed over a moving conveyor line so that the containers will land on the line in the upright position ready for filling.

The machine disclosed is adaptable for use with tube blanks which have been made on conventional convolute tube winding machines and which may be of two or more ply thickness. Such tubes are flattened with two score lines after they have been made and then shipped to the user. Likewise, tube blanks which have been made on conventional folding box machines with an overlapping joint and without flaps but with only two score or fold lines may be used on our machine.

It is to be understood that structural changes may be incorporated in the machine which differ from the preferred embodiment illustrated in the drawings and that our invention is to be limited only by the claims herein.

We claim:

1. A machine for making cylindrical containers from scored and flattened tubular blanks having a forming station, said forming station comprising a blank magazine for holding a supply of said flattened tubular blanks, a cylindrical forming section having a slot therein of a size to receive a single flattened blank, a blank delivery slide for moving a single blank from said magazine through said slot into said forming section, magazine feed means for feeding said blanks through said magazine, an assist plug guide extending parallel to movement of said blank delivery slide, an assist plug slidably mounted on said assist plug slide and extending into said forming section and movable radially therewith when contacted by a flattened blank; said blank spreading into a tubular configuration upon contacting said assist plug to engage the inner side walls of said cylindrical forming section.

2. A machine for making cylindrical containers from scored and flattened tubular blanks, said machine being of the type having a plurality of working stations circumferentially surrounding the vertical longitudinal axis of said machine, having a plurality of spindles rotatable about said vertical longitudinal axis and through said stations for moving a blank from one station to an adjacent station, and having spindle drive means rotating said spindles about said axis and through said stations; said stations including a forming station comprising a blank magazine for holding a supply of said flattened tubular blanks, magazine feed means for moving said blanks through said magazine, a cylindrical forming section having a slot therein of a size to receive a single flattened blank, a blank delivery slide for moving a single blank from said magazine through said slot into said forming section, an assist plug guide extending parallel to movement of said blank delivery slide, an assist plug slidingly mounted on said assist plug slide and extending into said forming section and movable radially therewith when contacted by a flattened blank; said blank spreading into a tubular configuration upon connecting said assist plug to engage the inner side walls of said cylindrical forming section.

3. A machine according to claim 2 having in addition transfer means for transferring said tubular blank from said forming section onto a spindle positioned in said forming station, said transfer means comprising a reciprocally vertically movable plunger positioned above said forming section and adapted to move in a downward direction to engage the bottom edge of said tubular blank to push it out of said forming section onto a spindle.

4. A method of making a cylindrical container from a scored and flattened tubular blank having two score lines, comprising the steps of applying a pushing force to one score line of said flattened tubular blank to push it edgewise into a substantially confined cylindrical space, applying a yielding force of less strength than said pushing force on the other score line of said scored and flattened tubular blank to cause said blank to spread in said confined space, and continuing to apply a pushing force to said blank until said blank obtains a tubular configuration substantially engaging the limits of said confined space.

5. A method of making a cylindrical container according to claim 4 comprising the additional steps of removing said blank from said confined space by pushing said tubular blank through one end of said confined space, pushing a round bottom lid having an upstanding edge into engagement with the bottom end of said blank, and crimping together the bottom edge of said blank and said upstanding edge of said bottom lid.

References Cited in the file of this patent

UNITED STATES PATENTS

| | | |
|---|---|---|
| 1,390,491 | Brenzinger | Sept. 13, 1921 |
| 2,110,998 | McDaniels | Mar. 15, 1938 |
| 2,604,826 | Palmer | July 29, 1952 |
| 2,698,559 | Harkess | Jan. 4, 1955 |
| 2,725,001 | O'Neil | Nov. 29, 1955 |
| 2,726,583 | Barnes et al. | Dec. 13, 1955 |
| 2,854,150 | Shea | Sept. 30, 1958 |
| 2,887,021 | Duffy et al. | May 19, 1959 |
| 2,902,002 | Argyle | Sept. 1, 1959 |